US011697959B2

(12) United States Patent
Fu (10) Patent No.: US 11,697,959 B2
(45) Date of Patent: Jul. 11, 2023

(54) ELECTRIC STRUT

(71) Applicant: GUANGDONG JUNCHI SCIENCE AND TECHNOLOGY CO., LTD., Guangdong (CN)

(72) Inventor: Chunbo Fu, Guangdong (CN)

(73) Assignee: GUANGDONG JUNCHI SCIENCE AND TECHNOLOGY CO., LTD., Guangdong (CN)

( * ) Notice: Subject to any disclaimer, the term of this patent is extended or adjusted under 35 U.S.C. 154(b) by 181 days.

(21) Appl. No.: 17/423,645

(22) PCT Filed: Mar. 4, 2021

(86) PCT No.: PCT/CN2021/079036
§ 371 (c)(1),
(2) Date: Jul. 16, 2021

(87) PCT Pub. No.: WO2022/057215
PCT Pub. Date: Mar. 24, 2022

(65) Prior Publication Data
US 2022/0341246 A1 Oct. 27, 2022

(30) Foreign Application Priority Data
Sep. 17, 2020 (CN) .......................... 202010982608.4

(51) Int. Cl.
*E05F 15/622* (2015.01)
*H02K 7/06* (2006.01)

(52) U.S. Cl.
CPC ............. *E05F 15/622* (2015.01); *H02K 7/06* (2013.01); *E05Y 2201/11* (2013.01);
(Continued)

(58) Field of Classification Search
CPC ......... E05Y 2900/546; E05Y 2201/702; E05Y 2201/474; E05Y 2201/434; E05Y 2201/11; H02K 7/06; E05F 15/622
See application file for complete search history.

(56) References Cited

U.S. PATENT DOCUMENTS

2009/0260463 A1* 10/2009 Fukano ................... H02K 7/116
74/89.33
2015/0069869 A1* 3/2015 Loeffler ................ E05F 1/1041
310/80
(Continued)

FOREIGN PATENT DOCUMENTS

CN  108547884 A  9/2018
CN  108590420 A  9/2018
(Continued)

OTHER PUBLICATIONS

International Search Report from PCT/CN2021/079036 dated Jun. 9, 2021 (7 pages).
(Continued)

*Primary Examiner* — David M Fenstermacher
(74) *Attorney, Agent, or Firm* — Ware, Fressola, Maguire & Barber LLP (57) ABSTRACT

A novel electric strut is disclosed, including an electric strut casing in which a supporting pipe casing is sleeved. A supporting pipe is installed in the supporting pipe casing, a screw rod has a front end connected with the rear end of the supporting pipe, a front end of the supporting pipe is connected with a ball-and-socket joint, a special-shaped conduit is sleeved outside the screw rod and located in the electric strut casing, a spring is sleeved on surfaces of the supporting pipe and the special-shaped conduit, an adjustable damper is mounted at a tail portion of the screw rod, a motor is mounted in the electric strut casing at a rear end of the screw rod and connected with the screw rod, a rear end
(Continued)

of the electric strut casing is sealed through an integrated motor joint integrally fixed to a tail portion of the motor.

6 Claims, 4 Drawing Sheets

(52) U.S. Cl.
CPC ... *E05Y 2201/434* (2013.01); *E05Y 2201/474* (2013.01); *E05Y 2201/702* (2013.01); *E05Y 2900/546* (2013.01)

(56) References Cited

U.S. PATENT DOCUMENTS

| | | | | |
|---|---|---|---|---|
| 2016/0312514 | A1* | 10/2016 | Leonard | F16H 25/2454 |
| 2017/0044814 | A1* | 2/2017 | Scheuring | B60J 5/106 |
| 2017/0191553 | A1* | 7/2017 | Heiberger | E05F 1/105 |
| 2018/0333842 | A1* | 11/2018 | McEntee | F16H 25/2204 |
| 2019/0106925 | A1* | 4/2019 | McCorkell | F16H 25/24 |
| 2019/0128323 | A1* | 5/2019 | Scheuring | F16F 1/025 |
| 2019/0169901 | A1* | 6/2019 | Yamagata | E05F 1/04 |
| 2020/0002992 | A1* | 1/2020 | Sekine | F16H 25/20 |
| 2020/0123830 | A1* | 4/2020 | Scheuring | E05F 3/221 |
| 2020/0190883 | A1* | 6/2020 | Scheuring | E05F 3/16 |
| 2020/0232267 | A1* | 7/2020 | Rehm | E05F 1/1058 |
| 2021/0270075 | A1* | 9/2021 | Sakiyama | F16H 25/20 |
| 2021/0301819 | A1* | 9/2021 | Reynolds | H02K 37/12 |
| 2022/0136294 | A1* | 5/2022 | Scheuring | B60J 5/10 16/85 |
| 2022/0136309 | A1* | 5/2022 | Cappelli | E05F 1/1058 49/31 |
| 2022/0235855 | A1* | 7/2022 | Li | F16H 25/24 |
| 2022/0243792 | A1* | 8/2022 | Varga | F16H 25/24 |
| 2022/0268074 | A1* | 8/2022 | Leonard | E05F 15/41 |
| 2022/0290482 | A1* | 9/2022 | Heiberger | E05F 15/622 |
| 2022/0341246 | A1* | 10/2022 | Fu | F16F 7/04 |

FOREIGN PATENT DOCUMENTS

| | | |
|---|---|---|
| CN | 209924733 U | 1/2020 |
| CN | 111042695 A | 4/2020 |
| CN | 112065207 A | 12/2020 |
| CN | 212359466 U | 1/2021 |
| DE | 102008061117 A1 | 6/2010 |
| JP | 2020002742 A | 1/2020 |

OTHER PUBLICATIONS

Written Opinion from PCT/CN2021/079036 dated Jun. 9, 2021 (7 pages).

* cited by examiner

ELECTRIC STRUT

CROSS-REFERENCE TO RELATED APPLICATIONS

This application is a national stage filing under 35 U.S.C. § 371 of international application number PCT/CN2021/079036, filed Mar. 4, 2021, which claims priority to Chinese patent application No. 2020109826084 filed Sep. 17, 2020. The contents of these applications are incorporated herein by reference in their entirety.

TECHNICAL FIELD

The present disclosure relates to an electric strut, and more particularly, to a novel electric strut.

BACKGROUND

With the continuous innovation and development of automobile technologies, the traditional method of manually opening a tailgate is being replaced by an electric tailgate. An electric tailgate strut serves as a force actuator of the electric tailgate, and the innovation of electric strut technology is a development trend of realizing smart and comfortable opening and closing of the automobile tailgate. However, the existing automobile electric tailgate strut is noisy during use, and a motor has a poor waterproof performance, which makes the motor easy to be damaged due to moisture or water ingress and thus damages the electric tailgate strut, thereby bringing certain inconvenience to the use of the automobile electric tailgate.

Chinese patent with the publication number CN209924733U discloses an assembly of an inner conduit and a screw rod for an electric strut of an automobile electric tailgate, including a screw rod and an inner conduit. The inner conduit is provided with a plurality of strip-shaped holes on an outer wall at one end of the inner conduit, a screw rod nut is formed by injection molding on an orifice at the one end of the conduit, a bump filling the strip-shaped hole is formed on the screw rod nut, the screw rod is screwed into the inner conduit through the screw rod nut, one end of the screw rod located in the inner conduit is provided with a damping limiting assembly, and one end of the screw rod located outside the inner conduit is connected into a damper. The other end of the inner conduit is rolled so that an inner wall of the inner conduit radially covers a ball socket joint partially extending into the inner conduit, the ball socket joint located in the inner conduit is provided with a groove for bearing the roll forming operation of the inner conduit, a sealing ring is arranged in the groove, and the ball socket joint located outside the inner conduit is connected with a ball pin of a mounting bracket of the automobile tailgate strut through a ball socket. One end of the inner conduit connected with the ball socket joint has a waterproof function. A plastic screw rod nut is directly formed by injection molding using the punched inner conduit, so that the structure is simpler and assembly is tight. However, the existing electric tailgate strut still has the following defects that: 1) the connection between the supporting pipe and the ball-and-socket joint is unreliable, which leads to a bursting risk of an internal spring; 2) the joint of the motor is complicated in structure and difficult to assemble; 3) the damper assembly is poor in expansion, and new damper parts are needed for different projects; and 4) the product has a short service life.

SUMMARY

In view of the shortcomings of the existing technology, the present disclosure provides a novel electric strut which has compact internal structure and high connection strength, and includes an adjustable damper assembly, so that the novel electric supporting rod can be subjected to platform-based adjustment to adapt to development requirements of different projects.

The present disclosure adopts the following technical solution: a novel electric strut includes an electric strut casing, wherein a supporting pipe casing is sleeved in the electric strut casing, a supporting pipe is mounted in the supporting pipe casing, a screw rod is mounted at a rear end of the supporting pipe, a front end of the screw rod is connected with the rear end of the supporting pipe through a screw rod nut, a front end of the supporting pipe is connected with a ball-and-socket joint, a special-shaped conduit is sleeved outside the screw rod and is located in the electric strut casing, a spring is sleeved on surfaces of the supporting pipe and the special-shaped conduit, an adjustable damper is mounted at a tail portion of the screw rod, a motor is mounted in the electric strut casing and is located at a rear end of the screw rod, the motor is connected with the screw rod through a coupler assembly, a rear end of the electric strut casing is sealed through an integrated motor joint, and the integrated motor joint is integrally fixed to a tail portion of the motor.

In the foregoing technical solution, both ends of the electric strut are respectively connected with a vehicle body and a tailgate through the ball-and-socket joint and the motor joint. When an ECU receives an action signal, the ECU may send an instruction to start the motor. The motor transmits a torque to the screw rod through the coupler assembly, and the screw rod is connected with the supporting pipe through the screw rod nut. The supporting pipe is driven by the screw rod and guided by the special-shaped conduit at the same time, so that extension/contraction of the supporting pipe is realized. Meanwhile, the spiral spring is arranged inside to assist a force to the motor, so that the tailgate can be opened and closed along with the extension/contraction of the strut. Because of the adjustable damper, the electric strut has a hovering function, which enables the tailgate to hover at any open position, and can accurately adjust the internal resistance of the supporting pipe according to the tailgate opening requirements of different models, so as to meet the use requirements under different use conditions.

Preferably, the ball-and-socket joint includes a ball socket and a metal joint, the ball socket and the metal joint are integrally molded by plastic coating, an inner end of the metal joint is provided with a slot, one end of the supporting pipe is squeezed and deformed inwardly by a slot rolling process and then clamped into the slot of the metal joint, and an outer end of the metal joint is provided with a metal flange edge. In the existing technology, threads are usually arranged on an outer surface of the supporting pipe and an inner surface of a plastic ball socket, and a connection between the supporting pipe and the plastic ball socket is realized by screwing in the threads. However, during the movement of the strut, due to an angle difference between the tailgate and the vehicle body, the strut will be subjected to a certain rotating force. To prevent the ball socket from being separated from the supporting pipe due to the rotating force, it is necessary to apply thread glue on the threads or finally knock in a pin, which is complicated in process and poor in reliability. Once the ball socket is separated from the supporting pipe, the spring inside the strut will burst open, posing a threat to the user. In order to eliminate this hidden danger, the present disclosure designs an integrated ball-and-socket joint, which combines the ball socket with the metal joint into a whole through a plastic coating process. Meanwhile, the inner end of the metal joint of the ball-and-socket joint is provided with the slot, the ball-and-socket joint is pre-mounted into the supporting pipe, and then the outer surface of the supporting pipe is extruded and deformed inwardly by a slot rolling process, and clamped into the slot of the metal joint, thereby realizing reliable connection between the ball-and-socket joint and the supporting pipe. Meanwhile, to completely prevent the bursting risk of the spring, the metal flange edge is preset at the metal joint, so that the internal stress of the spring is borne by the metal flange. Compared with the existing plastic ball socket design, this design is safer and more reliable, and at the same time, omits the complicated thread glue coating process, simplifies the production process and improves the production efficiency.

Preferably, the adjustable damper includes a cover plate, an upper friction plate, a friction sheet, a lower friction plate, a wave spring, and a damper housing, the wave spring is placed at a bottom portion of the damper housing, the lower friction plate is placed above the wave spring, an end edge of the lower friction plate is provided with a neck by means of which the lower friction plate is fitted and mounted in the damper housing, the friction sheet is placed above the lower friction plate, the upper friction plate is mounted above the friction sheet, an end edge of the upper friction plate is also provided with a neck by means of which the upper friction plate is fitted and mounted in the damper housing, the cover plate is covered on a top portion of the damper housing, and the friction sheet is connected to the screw rod through a driving wheel. An electric tailgate system often has hovering function. That is, the tailgate can hover at any open position. To realize this function, it is necessary to have a certain internal resistance inside the strut to achieve mechanical balance with the tailgate gravity, so as to prevent a half-open tailgate from falling or bouncing up. In order to increase the internal resistance, the present disclosure includes a modular damper structure, in which the friction sheet is preset between the lower friction plate and the upper friction plate, and under the stress action of the wave spring, the lower friction plate and the upper friction plate tightly clamp the friction sheet, and meanwhile, the friction sheet is connected with the screw rod in the strut through the driving wheel. In this way, when the screw rod rotates, the screw rod will drive the friction sheet to rotate. Because of the clamping force between the upper friction plate and the lower friction plate, friction damping will occur between the friction sheet and the friction plates, thus forming the internal resistance of the strut. Meanwhile, due to different batches of parts, a friction coefficient of the friction sheet, an elastic force of the spring and sizes of other parts will be deviated, which will lead to the deviation of damping forces of dampers assembled by different batches of parts. Therefore, the present disclosure designs a damping-adjustable design. The cover plate is added at the upper end of the upper friction plate, a stroke of the wave spring is adjusted by pressing the cover plate until an ideal damping effect is obtained, and finally, the cover plate is connected with the damper housing by a laser welding or hot riveting process, so that the influence of different batches of parts can be eliminated, and an accurate damping force effect can be obtained. To be expanded, aiming at different projects having different internal resistance requirements, this process may also be used to adjust the internal resistance, which only needs to adjust the process parameters without new parts, realizes product platformization, reduces the number of new parts, and facilitates product management.

Preferably, the cover plate is fixedly connected with the damper housing through a laser welding or hot riveting process.

Preferably, the coupler assembly includes a motor connecting shaft, a rubber buffering ring, a gasket, and a connecting base, the rubber buffering ring is mounted between the motor connecting shaft and the connecting base, the motor connecting shaft is directly inserted into the motor to complete assembly, and the connecting base is matched with a spline portion of the screw rod and is fixed by screwing and riveting through the gasket. Because the screw rod is often rigidly connected with the motor through splines, when the motor starts and stops frequently, the screw rod will impact with the motor continuously, and the motor or other internal parts will inevitably fail after a certain number of durability times, and different customers have different requirements for the durability times of products. To meet the requirements of some customers for high durability times, the modular coupling design is provided. By setting buffer rubber between the motor connecting shaft and the connecting base, the motor connecting shaft can be directly inserted into the motor to complete assembly, and the connecting base is matched with the spline portion of the screw rod and is fixed by screwing and riveting through the gasket. Through the coupling design, not only the coaxiality assembly requirement of the motor and the screw rod is reduced, but also the buffering between the motor and the screw rod is provided, thus greatly prolonging the service life of the product.

Preferably, the motor joint includes a rear-end ball socket, a wiring duct pipe, and a joint, and the rear-end ball socket and the wiring duct pipe are integrally molded by plastic coating and fixed at a tail portion of the joint. At the other end of the strut, on the ball socket side of the motor end, a split design is generally adopted in the existing technology, that is, the ball socket and the joint are separated, and there are thread features in the ball socket. Meanwhile, a hole is opened in a center of the joint, and a bolt passes through the central hole of the joint, and then is connected with the internal thread feature of the ball socket, which is high in cost and complicated in process.

Moreover, due to a bolt hole in the middle, an internal motor harness can only extend outward through an outer edge region, which is not conducive to the assembly of the harness. According to the present disclosure, by optimizing the structural design, the integrated plastic ball socket is used to lead out the harness from the center of the ball socket, so that the uniform wall thickness in the periphery is ensured, the number of parts is reduced without losing strength, the production process is simplified, and the production efficiency is improved.

The novel electric strut provided by the present disclosure has the beneficial effects as follows.

1) The novel electric strut has compact internal structure and high connection strength, and includes the adjustable damper assembly, so that the novel electric strut can be subjected to platform-based adjustment to adapt to development requirements of different projects.

2) The ball-and-socket joint adopts plastic-coated design, including metal and plastic parts. The connection between the plastic ball socket and the vehicle body can reduce the running friction noise. The metal part is connected with the supporting pipe by the slot rolling process, and the spring can be blocked by the flange part, thus greatly reducing the bursting risk of the spring and having high safety factor.

3) The motor joint adopts integrated design, with threading at the center and uniform wall thickness around, which integrates both strength and assembly performances.

4) The adjustable damper can adjust the internal stress of the spring by adjusting the pressing stroke, so as to realize product platformization, and adjust the process parameters for different projects.

5) Through the optimal design on the coupler assembly, not only the coaxiality assembly requirement of the motor and the screw rod is reduced, but also the buffering between the motor and the screw rod is provided, thus greatly prolonging the service life of the product.

In the drawings: 1 refers to ball-and-socket joint; 11 refers to ball socket; 12 refers to metal joint; 13 refers to metal flange edge; 14 refers to slot; 2 refers to supporting pipe casing; 3 refers to supporting pipe; 4 refers to spring; 5 refers to special-shaped conduit; 6 refers to screw rod; 61 refers to screw rod nut; 62 refers to electric strut casing; 7 refers to adjustable damper; 71 refers to cover plate; 72 refers to upper friction plate; 73 refers to friction sheet; 74 refers to lower friction plate; 75 refers to wave spring; 76 refers to damper housing; 8 refers to motor; 9 refers to motor joint; 91 refers to rear-end ball socket; 92 refers to wiring duct pipe; 93 refers to joint; 10 refers to coupler assembly; 101 refers to motor connecting shaft; 102 refers to rubber buffering ring; 103 refers to gasket; and 104 refers to connecting base.

DETAILED DESCRIPTION

Hereinafter, the technical solutions in the embodiments of the disclosure are illustrated clearly and completely with the accompanying drawings in the embodiments of the disclosure. Apparently, the described embodiments are merely some but not all of the embodiments of the disclosure. All other embodiments made by those of ordinary skills without the use of innovative efforts shall all belong to the scope of protection of the disclosure.

As shown in FIG. 1 to FIG. 8, a novel electric strut includes: an electric strut casing 62. A supporting pipe casing 2 is sleeved in the electric strut casing 62, and the supporting pipe casing 2 can be telescopically moved in the electric strut casing 62. A supporting pipe 3 is mounted in the supporting pipe casing 2. The supporting pipe 3, as an actuator for a thrust in the electric strut, can be pushed out or recovered so as to realize opening and closing of a tailgate. A screw rod 6 is mounted at a rear end of the supporting pipe 3, and a front end of the screw rod 6 is connected with the rear end of the supporting pipe 3 through a screw rod nut 61. A front end of the supporting pipe 3 is connected with a ball-and-socket joint 1, and a special-shaped conduit 5 is sleeved outside the screw rod 6 and is located in the electric strut casing 62. The special-shaped conduit 5 is a guiding part for the supporting pipe 3, and is used for guiding and restraining the supporting pipe 3 in a moving process. A spring 4 is sleeved on surfaces of the supporting pipe 3 and the special-shaped conduit 5. The spiral spring 4 enables the supporting pipe 3 to have a good buffer when being impacted by an external force. An adjustable damper 7 is mounted at a tail portion of the screw rod 6. A motor 8 is mounted in the electric strut casing 62 and is located at a rear end of the screw rod 6. The motor 8 is connected with the screw rod 6 through a coupler assembly 10, a rear end of the electric strut casing 62 is sealed through an integrated motor joint 9, and the integrated motor joint 9 is integrally fixed to a tail portion of the motor 8.

Figure 1:
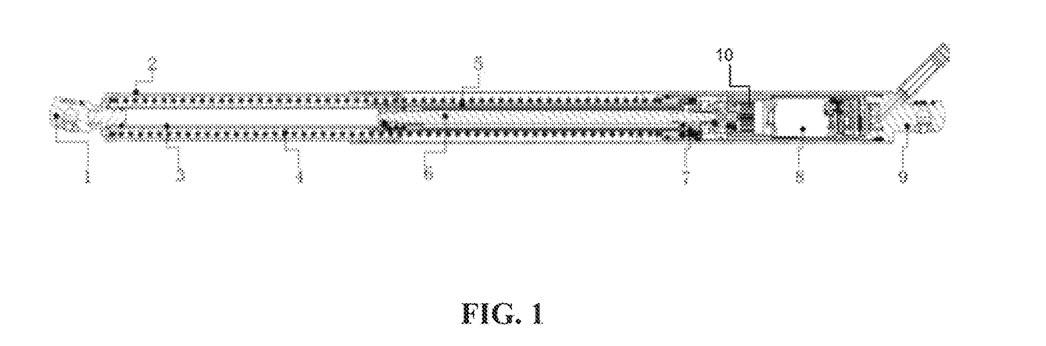
FIG. 1 is a schematic diagram of overall assembly of the present disclosure.
Figure 2:
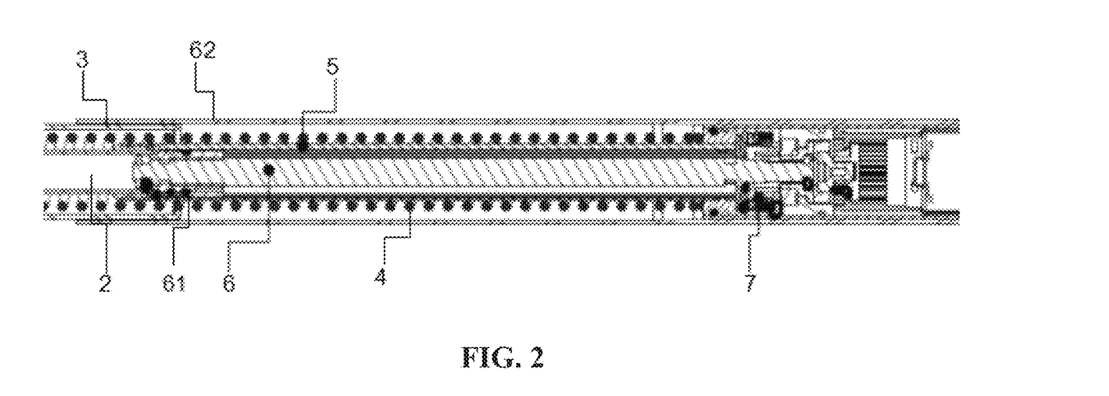
FIG. 2 is an enlarged schematic diagram of partial structural assembly of the present disclosure.

In this embodiment, both ends of the electric strut are respectively connected with a vehicle body and a tailgate through the ball-and-socket joint 1 and the motor joint 9. When an ECU receives an action signal, the ECU may send an instruction to start the motor 8. The motor 8 transmits a torque to the screw rod 6 through the coupler assembly 10, and the screw rod 6 is connected with the supporting pipe 3 through the screw rod nut 61. The supporting pipe 3 is driven by the screw rod 6 and guided by the special-shaped conduit 5 at the same time, so that extension/contraction of the supporting pipe 3 is realized. Meanwhile, the spiral spring 4 is arranged inside to assist a force to the motor, so that the tailgate can be opened and closed along with the extension/contraction of the supporting pipe 3. Because of the adjustable damper 7, the electric strut has a hovering function, which enables the tailgate to hover at any open position, and can accurately adjust the internal resistance of the supporting pipe according to the tailgate opening requirements of different models, so as to meet the use requirements under different use conditions.

Figure 3:
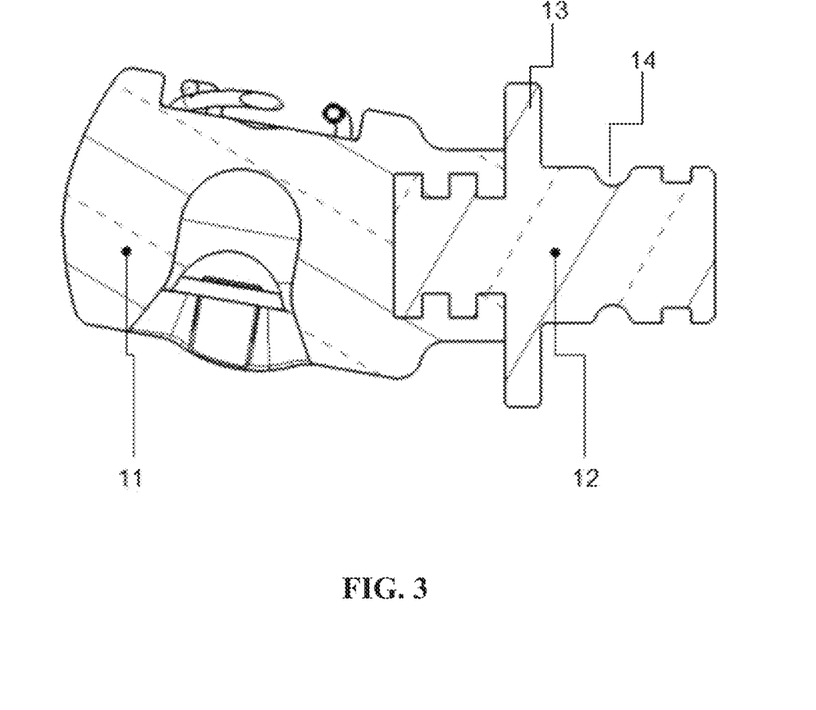
FIG. 3 is a sectional view of a ball-and-socket joint in the present disclosure.
Figure 4:
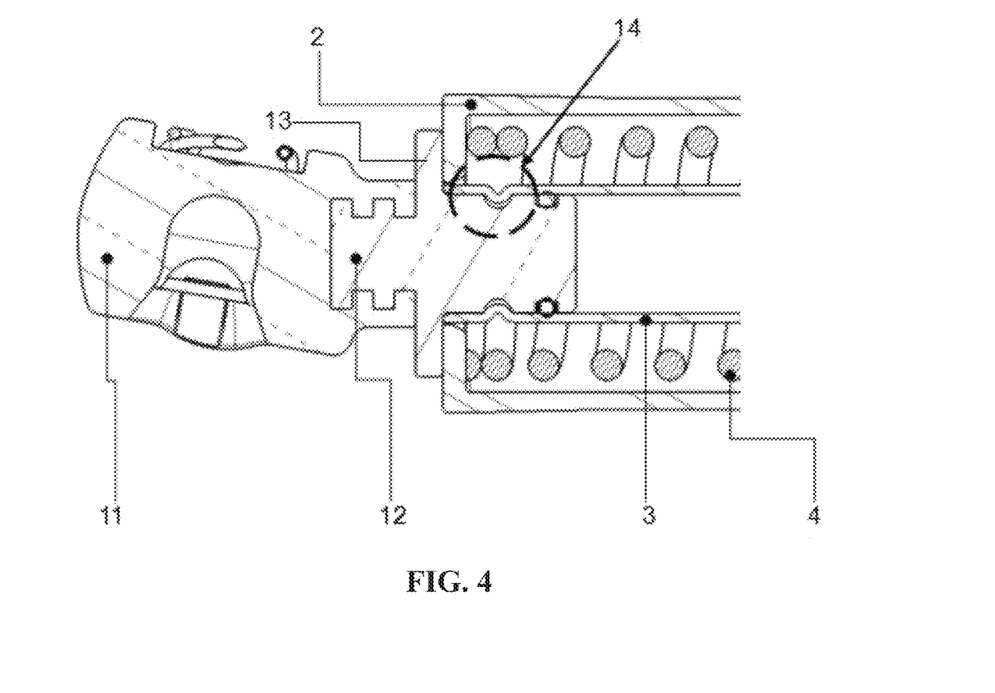
FIG. 4 is an assembly diagram of a ball-and-socket joint and a supporting pipe in the present disclosure.

As shown in FIG. 3 and FIG. 4, the ball-and-socket joint 1 includes a ball socket 11 and a metal joint 12, the ball socket 11 and the metal joint 12 are integrally molded by plastic coating, an inner end of the metal joint 12 is provided with a slot 14, one end of the supporting pipe 3 is squeezed and deformed inwardly by a slot rolling process and then clamped into the slot 14 of the metal joint 12, and an outer end of the metal joint 12 is provided with a metal flange edge 13. In the existing technology, threads are usually arranged on an outer surface of the supporting pipe 3 and an inner surface of a plastic ball socket 11, and a connection between the supporting pipe 3 and the plastic ball socket 11 is realized by screwing in the threads. However, during the movement of the strut, due to an angle difference between the tailgate and the vehicle body, the strut will be subjected to a certain rotating force. To prevent the ball socket 11 from being separated from the supporting pipe 3 due to the rotating force, it is necessary to apply thread glue on the threads or finally knock in a pin, which is complicated in process and poor in reliability. Once the ball socket 11 is separated from the supporting pipe 3, the spring 4 inside the strut will burst open, posing a threat to the user. In order to eliminate this hidden danger, the present disclosure designs an integrated ball-and-socket joint 1, which combines the ball socket 11 with the metal joint 12 into a whole through a plastic coating process. Meanwhile, the inner end of the metal joint 12 of the ball-and-socket joint 1 is provided with the slot 14, the ball-and-socket joint 1 is pre-mounted into the supporting pipe 3, and then the outer surface of the supporting pipe 3 is extruded and deformed inwardly by a slot rolling process, and clamped into the slot 14 of the metal joint 12, thereby realizing reliable connection between the ball-and-socket joint 1 and the supporting pipe 3. Meanwhile, to completely prevent the bursting risk of the spring 4, the metal flange edge 13 is preset at the metal joint 12, so that the internal stress of the spring 4 is borne by the metal flange 13. Compared with the existing plastic ball socket design, this design is safer and more reliable, and at the same time, omits the complicated thread glue coating process, simplifies the production process and improves the production efficiency.

Figure 5:
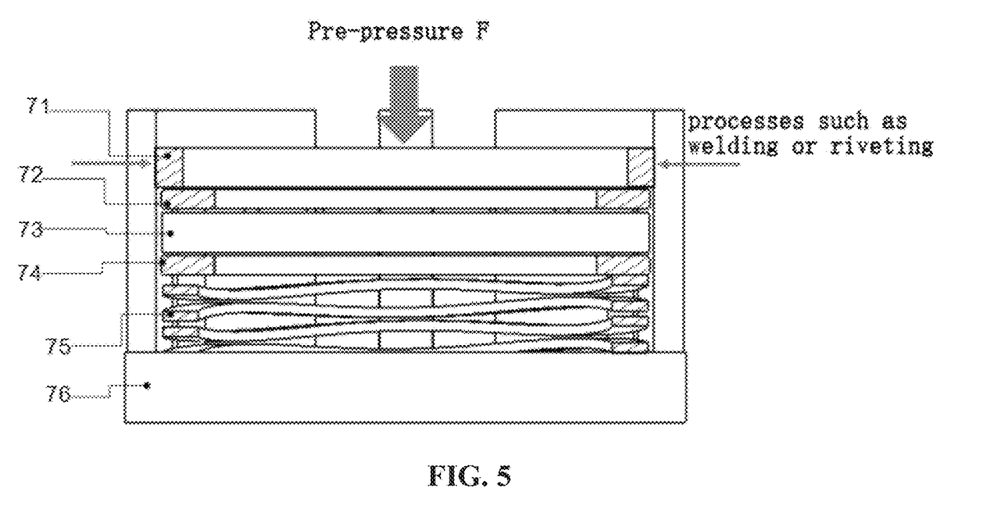
FIG. 5 is a sectional view of an adjustable damper in the present disclosure.
Figure 6:
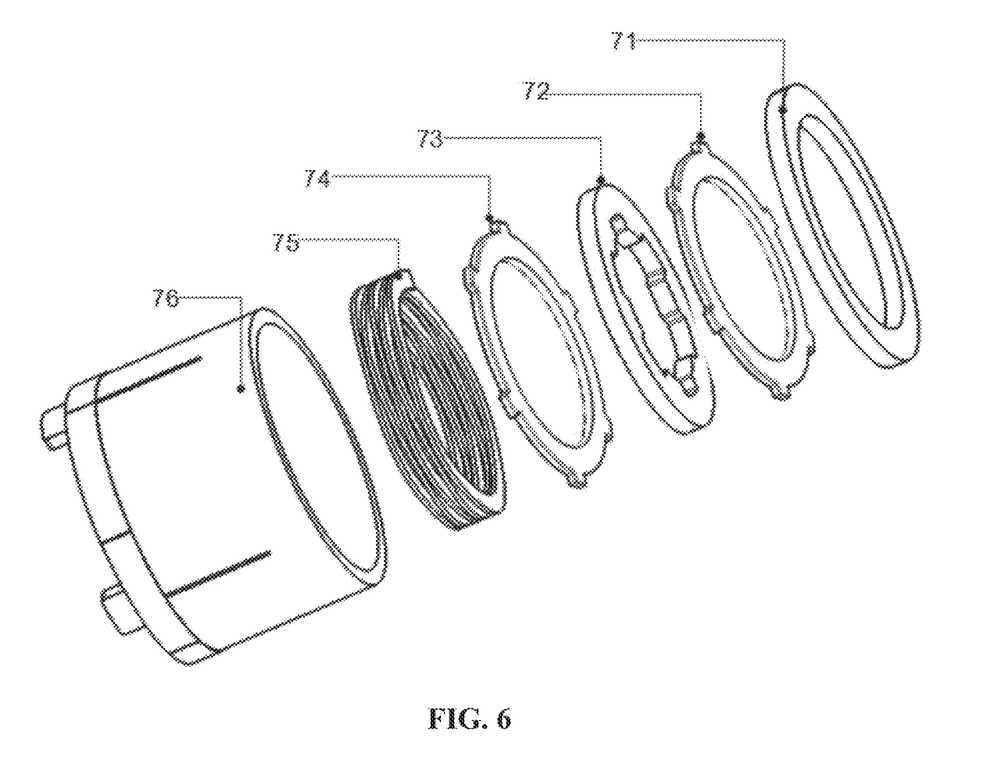
FIG. 6 is an explosion diagram of a three-dimensional structure of the adjustable damper of the present disclosure.

As shown in FIG. 5 and FIG. 6, the adjustable damper 7 includes a cover plate 71, an upper friction plate 72, a friction sheet 73, a lower friction plate 74, a wave spring 75, and a damper housing 76. The wave spring 75 is placed at a bottom portion of the damper housing 76, the lower friction plate 74 is placed above the wave spring 75, an end edge of the lower friction plate 74 is provided with a neck by means of which the lower friction plate 74 is fitted and mounted in the damper housing 76, the friction sheet 73 is placed above the lower friction plate 74, the upper friction plate 72 is mounted above the friction sheet 73, an end edge of the upper friction plate 72 is also provided with a neck by means of which the upper friction plate 72 is fitted and mounted in the damper housing 76, the cover plate 71 is covered on a top portion of the damper housing 76, and the friction sheet 73 is connected to the screw rod 6 through a driving wheel. An electric tailgate system often has hovering function. That is, the tailgate can hover at any open position. To realize this function, it is necessary to have a certain internal resistance inside the strut to achieve mechanical balance with the tailgate gravity, so as to prevent a half-open tailgate from falling or bouncing up. In order to increase the internal resistance, the present disclosure includes a modular damper structure, in which the friction sheet 73 is preset between the lower friction plate 74 and the upper friction plate 72, and under the stress action of the wave spring 75, the lower friction plate 74 and the upper friction plate 72 tightly clamp the friction sheet 73, and meanwhile, the friction sheet 73 is connected with the screw rod 6 in the strut through the driving wheel. In this way, when the screw rod 6 rotates, the screw rod will drive the friction sheet 73 to rotate. Because of the clamping force between the upper friction plate 72 and the lower friction plate 74, friction damping will occur between the friction sheet and the friction plates, thus forming the internal resistance of the strut. Meanwhile, due to different batches of parts, a friction coefficient of the friction sheet 73, an elastic force of the wave spring 75 and sizes of other parts will be deviated, which will lead to the deviation of damping forces of dampers assembled by different batches of parts. Therefore, the present disclosure designs a damping-adjustable design. The cover plate 71 is added at the upper end of the upper friction plate 72, a stroke of the wave spring 75 is adjusted by pressing the cover plate 71 until an ideal damping effect is obtained, and finally, the cover plate 71 is connected with the damper housing 76 by a laser welding or hot riveting process, so that the influence of different batches of parts can be eliminated, and an accurate damping force effect can be obtained. To be expanded, aiming at different projects having different internal resistance requirements, this process may also be used to adjust the internal resistance, which only needs to adjust the process parameters without new parts, realizes product platformization, reduces the number of new parts, and facilitates product management.

Figure 8:
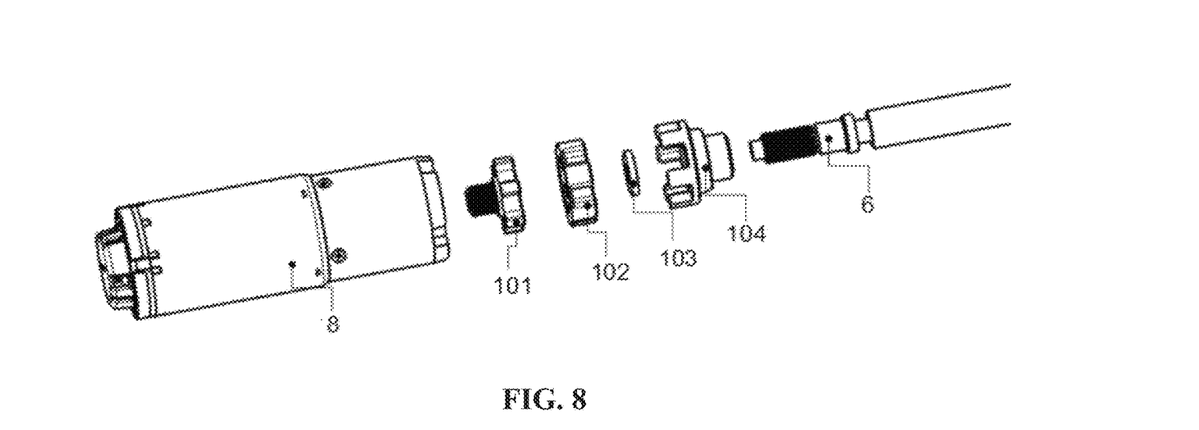
FIG. 8 is an explosion diagram of a three-dimensional structure of a coupler assembly of the present disclosure.

As shown in FIG. 8, the coupler assembly 10 includes a motor connecting shaft 101, a rubber buffering ring 102, a gasket 103, and a connecting base 104. The rubber buffering ring 102 is mounted between the motor connecting shaft 101 and the connecting base 104, the motor connecting shaft 101 is directly inserted into the motor 8 to complete assembly, and the connecting base 104 is matched with a spline portion of the screw rod 6 and is fixed by screwing and riveting through the gasket 103. Because the screw rod 6 is often rigidly connected with the motor 8 through splines, when the motor starts and stops frequently, the screw rod 6 will impact with the motor 8 continuously, and the motor 8 or other internal parts will inevitably fail after a certain number of durability times, and different customers have different requirements for the durability times of products. To meet the requirements of some customers for high durability times, the modular coupling design is provided. By setting the rubber buffering ring 102 between the motor connecting shaft 101 and the connecting base 104, the motor connecting shaft 101 can be directly inserted into the motor 8 to complete assembly, and the connecting base 104 is matched with the spline portion of the screw rod 6 and is fixed by screwing and riveting through the gasket 103. Through the coupling design, not only the coaxiality assembly requirement of the motor 8 and the screw rod 6 is reduced, but also the buffering between the motor 8 and the screw rod 6 is provided, thus greatly prolonging the service life of the product.

Figure 7:
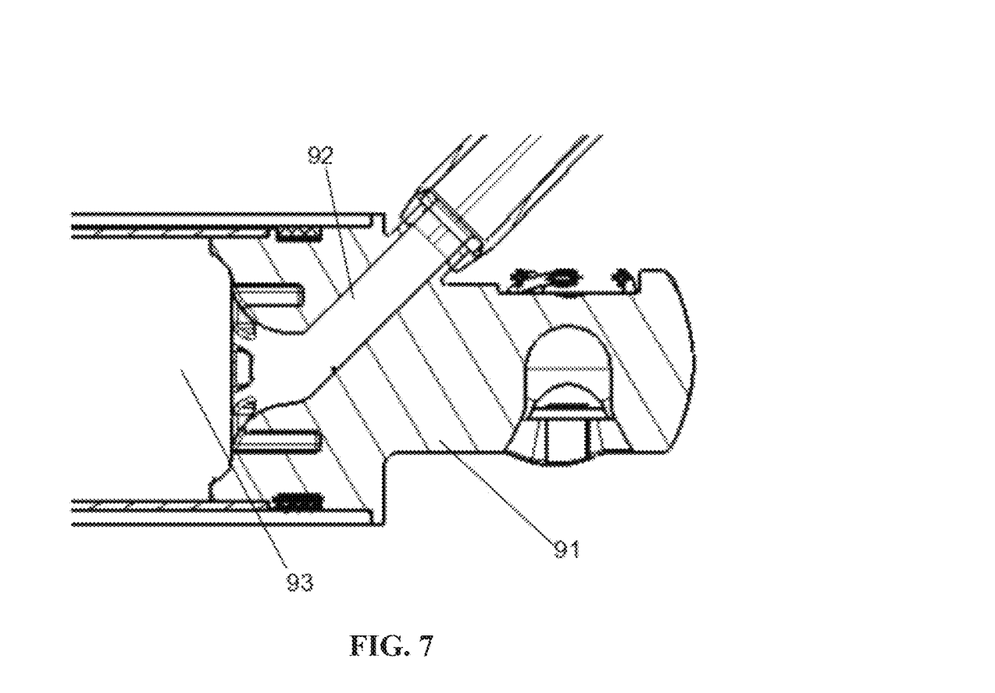
FIG. 7 is a sectional view of a motor joint in the present disclosure.

As shown in FIG. 7, the motor joint 9 includes a rear-end ball socket 91, a wiring duct pipe 92, and a joint 93, and the rear-end ball socket 91 and the wiring duct pipe 92 are integrally molded by plastic coating and fixed at a tail portion of the joint 93. The joint 93 is welded on a housing of the motor 8. At the other end of the strut, on the ball socket side of the motor 8 end, a split design is generally adopted in the existing technology, that is, the ball socket and the joint are separated, and there are thread features in the ball socket. Meanwhile, a hole is opened in a center of the joint, and a bolt passes through the central hole of the joint, and then is connected with the internal thread feature of the ball socket, which is high in cost and complicated in process. Moreover, due to a bolt hole in the middle, an internal motor harness can only extend outward through an outer edge region, which is not conducive to the assembly of the harness. According to the present disclosure, by optimizing the structural design, the integrated plastic ball socket is used to lead out the harness from the wiring duct pipe 92 at the center of the ball socket, so that the uniform wall thickness in the periphery is ensured, the number of parts is reduced without losing strength, the production process is simplified, and the production efficiency is improved.

The electric strut has compact internal structure and high connection strength, and includes the adjustable damper assembly, so that the electric strut can be subjected to platform-based adjustment to adapt to development requirements of different projects. The ball-and-socket joint adopts plastic-coated design, including metal and plastic parts. The connection between the plastic ball socket and the vehicle body can reduce the running friction noise. The metal part is connected with the supporting pipe by the slot rolling process, and the spring can be blocked by the flange part, thus greatly reducing the risk of spring bursting and having high safety factor. The motor joint adopts integrated design, with threading at the center and uniform wall thickness around, which integrates both strength and assembly performances. The adjustable damper can adjust the internal stress of the spring by adjusting the pressing stroke, so as to realize product platformization, and adjust the process parameters for different projects. Through the optimal design on the coupler assembly, not only the coaxiality assembly requirement of the motor and the screw rod is reduced, but also the buffering between the motor and the screw rod is provided, thus greatly prolonging the service life of the product.

The above embodiments are only preferred embodiments of the present disclosure, while the scope of protection of the present disclosure is not limited to the contents disclosed in the embodiments and accompanying drawings. Any modifications, substitutions or improvements made without departing from the gist of the present disclosure shall all fall within the scope of protection of the present disclosure.

What is claimed is:

1. A electric strut, comprising: an electric strut casing, wherein a supporting pipe casing is sleeved in the electric strut casing, a supporting pipe is mounted in the supporting pipe casing, a screw rod is mounted at a rear end of the supporting pipe, a front end of the screw rod is connected with the rear end of the supporting pipe through a screw rod nut, a front end of the supporting pipe is connected with a ball-and-socket joint, a special-shaped conduit is sleeved outside the screw rod and is located in the electric strut casing, a spring is sleeved on surfaces of the supporting pipe and the special-shaped conduit, an adjustable damper is mounted at a tail portion of the screw rod, a motor is mounted in the electric strut casing and is located at a rear end of the screw rod, the motor is connected with the screw rod through a coupler assembly, a rear end of the electric strut casing is sealed through an integrated motor joint, and the integrated motor joint is integrally fixed to a tail portion of the motor.

2. The electric strut according to claim 1, wherein the ball-and-socket joint comprises a ball socket and a metal joint, the ball socket and the metal joint are integrally molded by plastic coating, an inner end of the metal joint is provided with a slot, one end of the supporting pipe is squeezed and deformed inwardly by a slot rolling process and then clamped into the slot of the metal joint, and an outer end of the metal joint is provided with a metal flange edge.

3. The electric strut according to claim 1, wherein the adjustable damper comprises a cover plate, an upper friction plate, a friction sheet, a lower friction plate, a wave spring, and a damper housing, the wave spring is placed at a bottom portion of the damper housing, the lower friction plate is placed above the wave spring, an end edge of the lower friction plate is provided with a neck by means of which the lower friction plate is fitted and mounted in the damper housing, the friction sheet is placed above the lower friction plate, the upper friction plate is mounted above the friction sheet, an end edge of the upper friction plate is also provided with a neck by means of which the upper friction plate is fitted and mounted in the damper housing, the cover plate is covered on a top portion of the damper housing, and the friction sheet is connected to the screw rod through a driving wheel.

4. The electric strut according to claim 3, wherein the cover plate is fixedly connected with the damper housing through a laser welding or hot riveting process.

5. The electric strut according to claim 1, wherein the coupler assembly comprises a motor connecting shaft, a rubber buffering ring, a gasket, and a connecting base, the rubber buffering ring is mounted between the motor connecting shaft and the connecting base, the motor connecting shaft is directly inserted into the motor to complete assembly, and the connecting base is matched with a spline portion of the screw rod and is fixed by screwing and riveting through the gasket.

6. The electric strut according to claim 1, wherein the motor joint comprises a rear-end ball socket, a wiring duct pipe, and a joint, and the rear-end ball socket and the wiring duct pipe are integrally molded by plastic coating and fixed at a tail portion of the joint.

* * * * *